United States Patent
Oriet (10) Patent No.: US 8,342,556 B2
(45) Date of Patent: Jan. 1, 2013

(54) LOWRIDER AERODYNAMIC TRUCK

(75) Inventor: Leo P. Oriet, Rochester Hills, MI (US)

(73) Assignee: Navistar Canada, Inc. (CA)

( * ) Notice: Subject to any disclaimer, the term of this patent is extended or adjusted under 35 U.S.C. 154(b) by 0 days.

(21) Appl. No.: 13/081,032

(22) Filed: Apr. 6, 2011

(65) Prior Publication Data
US 2012/0256392 A1    Oct. 11, 2012

(51) Int. Cl.
*B60G 17/00* (2006.01)
*B62D 53/06* (2006.01)
*B62D 53/08* (2006.01)

(52) U.S. Cl. ............ 280/425.1; 280/5.514; 280/6.157; 280/43.17; 280/786; 280/787

(58) Field of Classification Search .......... 280/425.1, 280/5.514, 6.15, 6.157, 43.17, 43.18, 43.23, 280/124.116, 124.128, 124.135, 124.153, 280/677, 678, 683, 786, 787
See application file for complete search history.

(56) References Cited

U.S. PATENT DOCUMENTS

| | | | | |
|---|---|---|---|---|
| 1,995,500 | A | * | 3/1935 | Dillon ............ 280/787 |
| 3,276,532 | A | * | 10/1966 | Yonkers ............ 180/54.1 |
| 4,229,021 | A | * | 10/1980 | Schmid et al. ............ 280/787 |
| 4,699,399 | A | | 10/1987 | Jable |
| 4,924,961 | A | * | 5/1990 | Bernardi ............ 180/374 |
| 7,320,469 | B2 | | 1/2008 | Bromley |
| 7,789,412 | B2 | | 9/2010 | Alguera |
| 7,950,678 | B1 | * | 5/2011 | Bauder ............ 280/43.18 |
| 7,954,835 | B2 | * | 6/2011 | Nakamura et al. ..... 280/124.135 |
| 2003/0151222 | A1 | | 8/2003 | Sutton |
| 2005/0253353 | A1 | * | 11/2005 | Yamamura et al. .... 280/124.135 |
| 2007/0278752 | A1 | * | 12/2007 | Schedgick ............ 280/5.507 |
| 2009/0273159 | A1 | | 11/2009 | Sutton |
| 2010/0275766 | A1 | | 11/2010 | Joynt |
| 2011/0018219 | A1 | | 1/2011 | Oriet |

* cited by examiner

*Primary Examiner* — Ruth Ilan
*Assistant Examiner* — Marc A Scharich
(74) *Attorney, Agent, or Firm* — Jeffrey P. Calfa; Mark C. Bach (57) ABSTRACT

A truck for towing a trailer includes a vehicle frame spine, a pair of suspension assemblies extending from either side of the vehicle frame spine and each supports a drive assembly at an end distal to the vehicle frame spine. Extensible struts are positioned between the vehicle frame spine and the drive assemblies allowing selection of vehicle drive height from a driving surface. A fifth wheel assembly is supported from the vehicle frame spine located above the drive assemblies. The fifth wheel assembly includes a fifth wheel and a fifth wheel lift which varies spacing of the fifth wheel from the vehicle frame spine. Control system selects strut extension based on a selected vehicle drive height and operates the lift assembly to counteract changes in vehicle drive height and maintain a constant fifth wheel drive height relative to the driving surface.

15 Claims, 6 Drawing Sheets

LOWRIDER AERODYNAMIC TRUCK

BACKGROUND

The technical field relates to controlling motor vehicle aerodynamic drag. The vehicle ride height of a truck, the nominal vertical distance between the chassis of a vehicle and the ground or road surface, is adjusted as a function of trailer type and load to reduce aerodynamic drag. Control over the adjustment process is implemented through automatic and manual inputs which also mediates for road conditions.

The average new vehicle fuel economy for heavy-heavy long haul trucks (25+ ton loads with engine displacement ranging from 11 liters to 15 liters) in 2003 was 6.1 mpg. The annual average improvement in fuel economy for such vehicles from 1995 to 2010 was 0.88% with about two thirds of the improvement coming from changes made to the engine and transmission, and one third of the improvement coming from better aerodynamics and reduced tire rolling resistance. Engine changes have related primarily to improvements in electronic fuel injection, combustion improvements and reduction in friction. Aerodynamic improvements have included increased use of cab fairings and spoilers. Second generation radial tires exhibit some reduction in rolling resistance over the prior generation. Continued refinement of these technologies should continue to provide some gains for a few years, but continuing to meet the historical pace of year on year improvements of 0.88% a year is unlikely.

Vehicle aerodynamic resistance is a function of the vehicle's drag coefficient, its effective frontal area and its height above the driving surface. In truck/trailer combinations the trailer usually has a greater frontal area than the truck due to extending above the truck's height. On such vehicles aerodynamic resistance can be reduced by streamlining the truck and incorporating fairings to the truck which expand the frontal area of the truck to match the trailer but which extend the streamlining of the truck to the trailer.

Extending streamlined fairings from the truck to the trailer is less effective, and even self-defeating, if the trailer is not as tall as the truck and the fairings simply operate to increase the frontal area of the truck. In such cases there is more to be gained in terms of reduced drag by lowering the truck to as close to the road surface as practical. However, dynamic application of a system for changing the vehicle ride height of heavy-heavy commercial trucks has not been considered practicable. For one thing, heavy-heavy commercial trucks have been designed to operate at a specific ride height to match a fixed fifth wheel height required by most trailers.

Air suspension systems have become common on trucks and trailers and one of their attributes has been their ability to maintain a constant vehicle ride height. Air suspension systems allow the carrying of loads of varying weight at a constant height because the air pressure in the air spring bladders which support the load can be varied as required to level the vehicle and to bring vehicle ride height back to nominal distances. Closed loop control systems have been employed to maintain vehicle ride height. The load an air suspension carries can be adjusted over a wide range, without changing the air spring height, simply by changing the air pressure. In addition to changing the load-carrying capability, a change in air pressure also affords changing the spring rate without a significant change in the natural frequency of the suspension system.

SUMMARY

A truck for towing a trailer includes a vehicle backbone frame/frame spine, a pair of double wishbone suspension assemblies extending from either side of the vehicle frame spine and direct drive assemblies located at the ends of the double wishbone suspension assemblies distal to the vehicle frame spine. Extensible struts are positioned between the vehicle frame spine and the direct drive assemblies allowing vehicle drive height from a driving surface to be selected. A fifth wheel assembly is supported from the vehicle frame spine located above the direct drive assemblies. The fifth wheel assembly includes a fifth wheel and a fifth wheel lift assembly which is operable to vary the spacing of the fifth wheel from the vehicle frame spine. A control system selects an extension of the struts based on a selected vehicle drive height and a operates the fifth wheel lift assembly to counteract changes in vehicle drive height and maintain a constant fifth wheel drive height relative to the driving surface.

DETAILED DESCRIPTION

Figure 1:
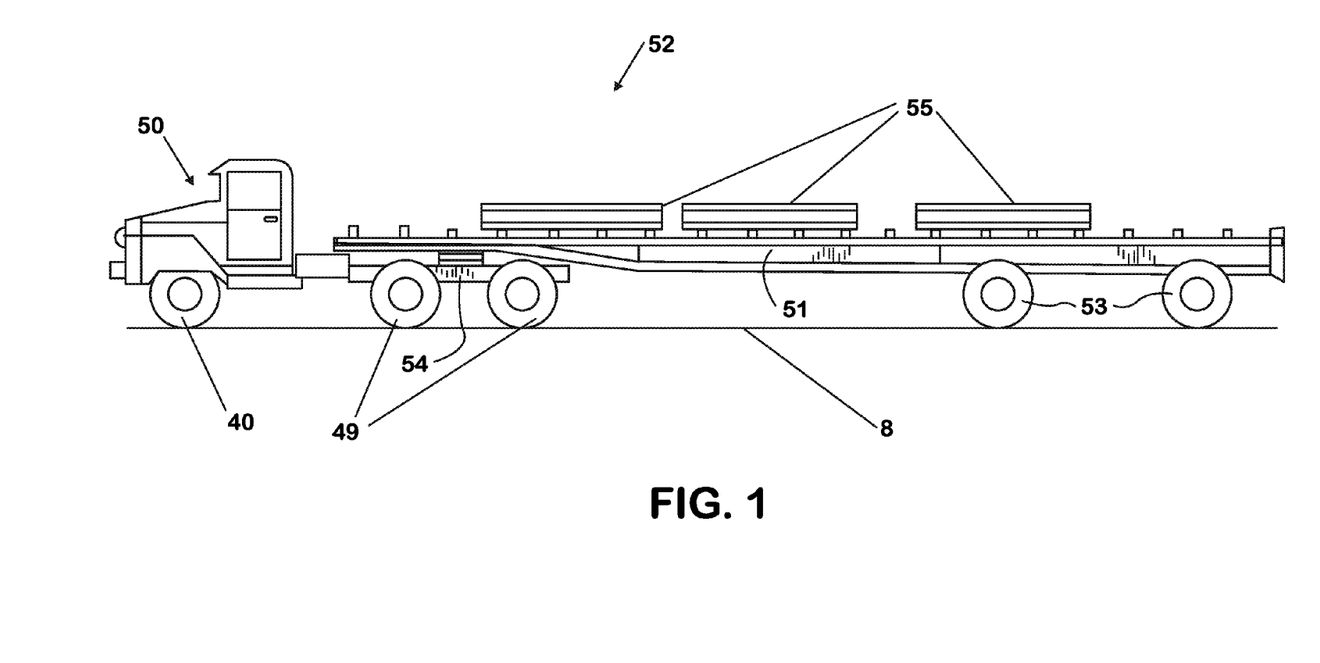
FIG. 1 is a side elevation of a vehicle comprising a truck and flat bed trailer.
Figure 2:
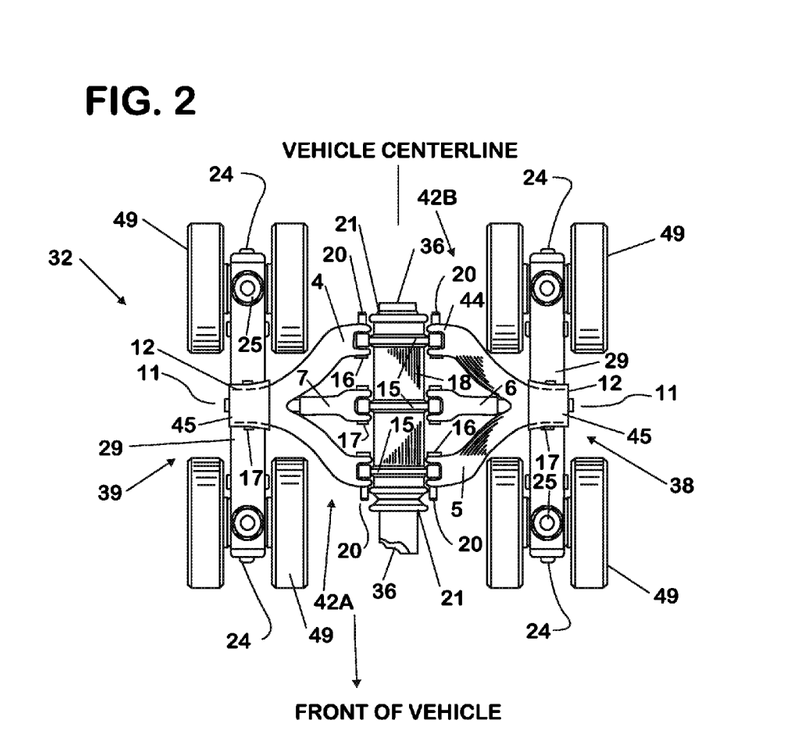
FIG. 2 is a top view of a suspension assembly for mounting a drive axle to a backbone frame/frame spine.
Figure 3:
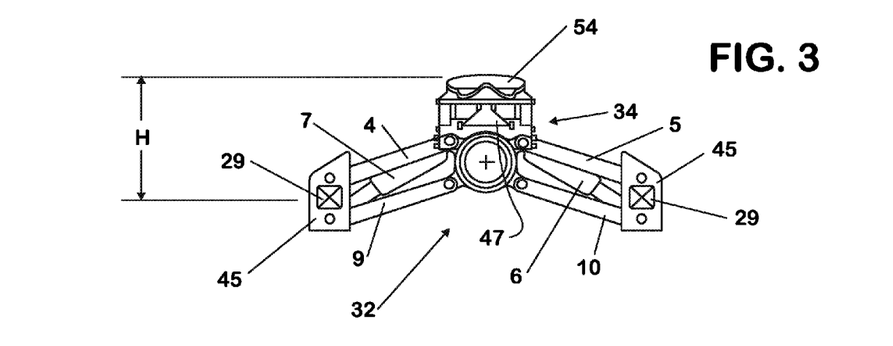
FIG. 3 is a front view of the suspension assembly.
Figure 4:
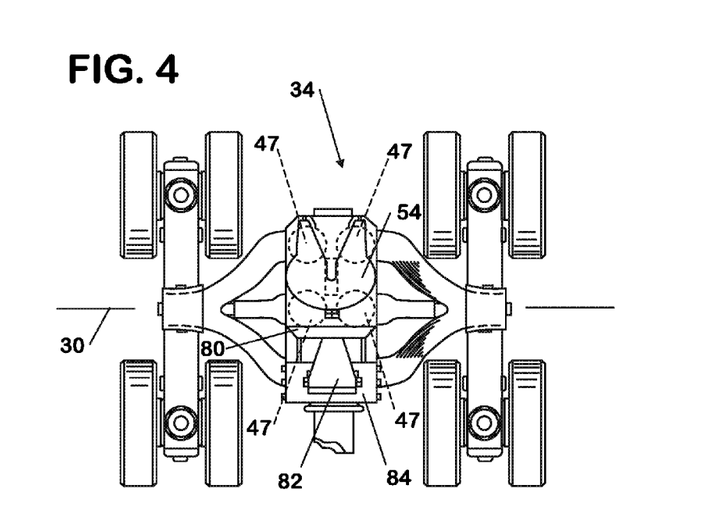
FIG. 4 is a top view of the suspension assembly illustrating positioning of a fifth wheel.
Figure 5:
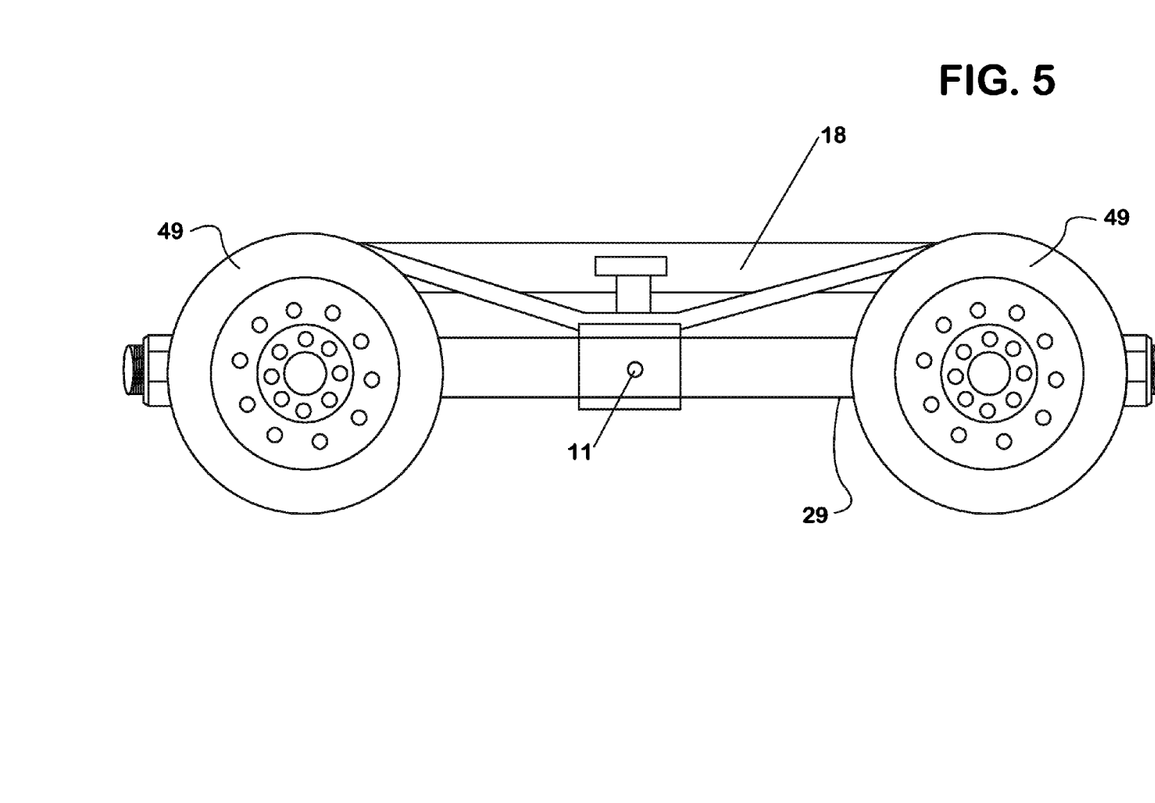
FIG. 5 is a side elevation of the suspension assembly.

Referring now to the figures, and in particular FIG. 1, a vehicle 52 is indicated comprising a truck 50 and a flat bed trailer 51 attached to be towed by the truck. The attachment of the trailer 51 to the truck 50 is made using a fifth wheel 54 which allows vehicle 52 to articulate. The fifth wheel 54 (shown in FIG. 4) is installed at the back of truck 50 over the drive wheels 49. Flat bed trailer 51 is supported by the fifth wheel 54 and on wheels 53 at a constant vehicle ride height above a driving surface 8. A constant vehicle ride height for the flat bed trailer 51 maybe maintained by use of a suspension system including variable pressure air springs. Truck 50 though may be raised and lowered while fifth wheel 54 is maintained at a constant height to support the constant vehicle ride height of flat bed trailer 51. Flat bed trailer 51 carries a load 55 which does not extend above the truck 50 when the truck is at its default height. This allows truck 50 to be lowered to reduce aerodynamic drag.

Provision for a variable vehicle ride height for truck 50 is accomplished through control of a suspension assembly 32 for the truck's drive wheels 49. Modification of the fifth wheel 54 allows this support point for the flat bed trailer to be kept at a constant vehicle ride height. FIGS. 2-6 illustrate the suspension assembly 32 and fifth wheel assembly 34 and their cooperative operation. Suspension assembly 32 relates to support of a particular type of vehicle frame based on a longitudinally aligned backbone or spine located down the centerline of the in the truck 50. Suspension assembly 32 provides essentially double wishbone arrangements incorporating extensible struts 6, 7. Controlling the nominal extension of the struts 6, 7 varies the vehicle ride height of the truck 50. The fifth wheel assembly 34 incorporates its own extensible members allowing the height from the frame of the fifth wheel 54 to be varied concurrently with the vehicle ride height of the truck 50.

Suspension assembly 32 is attached to fifth wheel assembly 34 at a fifth wheel attachment location 20 using a plurality of pins 16 that transmit the acceleration and deceleration forces of the truck 50 to the fifth wheel 54. The suspension assembly 32 attaches a direct drive axle assembly 38 to a frame spine 36. The backbone frame or frame spine 36 is sagittal to the truck 50.

The suspension assembly 32 receives the frame spine 36 of truck 50 generally centrally and generally longitudinally through the assembly along a receiving cavity 19. The frame spine 36 may be a light-weight, high strength tubular steel, structural composite or any other structural material frame. The frame spine 36 is received in the receiving cavity 19. The frame spine 36 extends the length of receiving cavity 19 and is exposed at a rear end of the cavity. The position of the frame spine 36 is locked with respect to the suspension assembly 32 with a pin or other suitable means.

The suspension assembly 32 is configured for mounting the drive axle assembly 38, such as an independent dual wheel direct drive axle to the frame spine 36, however it is possible that the suspension assembly 32 can be used with other types of drive axles and rear suspensions. For example, the direct drive axle assembly 38 may have a front direct drive unit 23 and a rear direct drive unit 22 that are pivotally disposed on a spindle shaft 24, however other numbers of drive axles are possible. The direct drive axle assembly 38 may have a cushion ride suspension 25 and be attached to the suspension assembly 32 with a walking beam 29. When the direct drive axle assembly 38 drives over an uneven driving surface, the direct drive axle assembly 38 independently oscillates with respect to the frame spine 36 so that the wheels 49 encountering the uneven driving surface can traverse the surface while the wheels 49 not encountering the uneven driving surface remain in contact with the driving surface.

The left and right drive axle assemblies 38 are located mutually opposite one another and are mirror-images of each other. The front and rear axles on the direct drive axle assemblies 38 oscillate independently of one another. Together, the suspension assembly 32 and the direct drive axle assemblies 38 are attachable to the frame spine 36 to provide independent oscillation from the left side to the right side of the frame spine, and from the front set of wheels 49 to the rear set of wheels 49 associated with each direct drive axle assembly 38.

The suspension assembly 32 includes a left sub-frame 42A and a right sub-frame 42B that are attached to a suspension tube 18. Sub-frames 42A, 42B respectively incorporate upper frame members 4, 5 and lower frame members 9, 10, where the upper frame members 4 and 5 are common parts and where frame members 9 and 10 are common parts. The upper frame members 4, 5 and the lower frame members 9, 10 may be generally clevis-shaped or Y-shaped (essentially A-arms) with upper ends 44 attached to the suspension tube 18, however other shapes are possible. The upper and lower frame members 4, 5, 9, 10 can be made of cast iron, compacted graphite iron, structural composite, manufactured steel or any other material that provides the structural strength and material properties for the vehicle service loads. The sub-frames 42A, B are essentially double wishbones usually constructed with equal length A-arms.

The suspension tube 18 may be a high strength, light-weight steel tube with an inside diameter that is slightly larger than an outside diameter of the frame spine 36, however other configurations are possible. The sub-frames 42A, 42B, are pivotally attached to the suspension tube 18 with the hinge pins 16 and 17 at clevis hinges for the upper frame members 4, 5 and the lower frame members 9, 10 respectively. The pins 16 extend beyond the clevis and are used to attach to service loads, such as the fifth wheel assembly 34. Hinge rings 15 are concentrically attached to the suspension body 18, for example with retainers 21, and receive the hinge pins 17.

Opposite the upper ends 44, lower ends 45 of the sub-frames 42A, 42B are received in a receiving structure 12 and pinned with hinge pins 17 and lock nut (not shown). The receiving structure 12 may be a box having a parallelogram-shape, however other configurations are possible. Receiving holes 13, 14 are disposed through the receiving structure 12 for receiving direct drive axle assemblies 38. Here a pivot of walking beam 29 is pinned in place with a king pin 11. In the receiving holes 13, 14 the walking beam 29 is generally parallel with the frame spine 36 and rotates in a plane parallel to the frame spine.

Each sub-frame 42A, 42B may mount four wheels 40 to the frame spine 36 on one side (left or right) of the frame. Each suspension assembly 32 may mount eight wheels 49 to the frame spine 36, generally with an even amount of wheels on each side (left and right) of the frame spine. It is possible that some vehicles may be equipped with two or more suspension assemblies 32 on the extended frame spine 36 with a one piece rigid architecture or a frame made of multiple piece members joined together with hinged articulation.

Figure 7A:
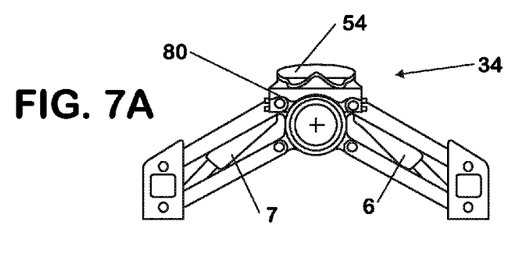
FIGS. 7A and 7B illustrate a raised suspension assembly and a cooperatively lowered fifth wheel assembly.
Figure 7B:
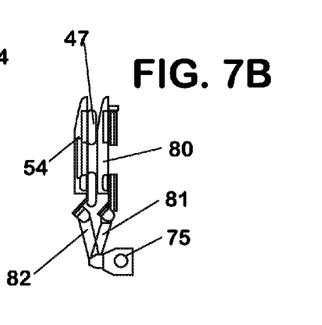
Figure 9A:
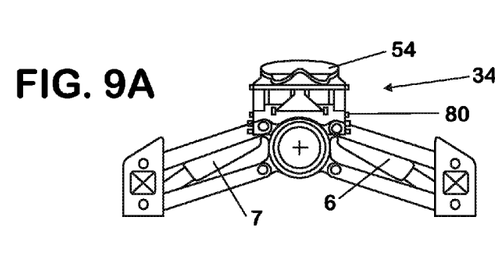
FIGS. 9A and 9B illustrate a lowered suspension assembly and cooperative elevation of the fifth wheel assembly.
Figure 9B:
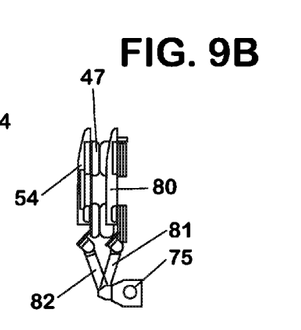

Hydraulic/pneumatic struts 6, 7 extend from the suspension body 18, generally centrally between the clevis-shaped upper frames 4, 5 to the receiving structure 12. A first end 46 of the struts 6, 7, attaches to a hinge ring 15 with hinge pins 17 and lock nuts, and a second end 48 of the struts 6, 7 attaches to the receiving structure 12 with pins 17A. The struts 6, 7 dampen the pivotal movement of the receiving structure 12 of the sub-frames 42A, 42B with respect to the frame spine 36. The pivotal movement of the sub-frames 42A, 42B with respect to the suspension body 18 results in movement of the receiving structure 12, which accommodates the oscillation of the direct drive axle assemblies 38. Hydraulic fluid may be pumped/withdrawn into the struts 6, 7 or air pressure varied to change the default extension of the struts and thereby raise or lower the frame spine 36 as shown in FIGS. 9A (lowered) and 7A (raised). If chosen, the front end elevation of truck 50 may be varied by changing the extension of front air springs 74.

FIGS. 9A, B and 7A, B illustrate details of the construction of the fifth wheel assembly 34 and the operation of the fifth wheel lift mechanism 47, which is usually based on air bladders or air springs. The fifth wheel lift mechanism 47 in turn passes through a cradle 80 and rests on a base 84 which is supported from the pins 20. The fifth wheel 54 and cradle 80 are positionally stabilized relative to the base 84 by an anchor 75 supported from the bask which is linked to the fifth wheel and cradle respectively by a scissor action linkage including an upper stabilizer arm 82 and a lower stabilizer arm 81. The upper and lower stabilizer arms 82 and 81 are pivotally connected to the anchor 75 at one end and to the fifth wheel 54 or cradle 80 at their ends distal to the anchor. Fifth wheel assembly 34 provides that the fifth wheel 54 be supported by the four air springs of the fifth wheel lift mechanism 47. Inflation of the fifth wheel lift mechanism 47 counteracts lowering of the frame spine 36, which occurs upon retraction/contraction of the struts 6 and 7. Deflation of the fifth wheel lift mechanism 34 in turn counteracts extension of the struts 6 and 7 to maintain the fifth wheel 54 at a constant vehicle ride height.

The suspension assembly 32 with the direct drive axle 38 provides three axes of articulation to traverse roadway obstructions as well as the ability to raise and lower the truck 50. The first independent axis of oscillation is between each of the direct drive units 22, 23 about the axis created by pin of the spindle shaft 24 at (the left to right direction). The second independent axis of oscillation is about pin 11 at a drive axle axis of rotation 30 (the front to rear direction, shown in FIG. 4). The third independent axis of oscillation is sub-frame 42A, 42B of the suspension assembly 32 about the frame spine 36.

Each suspension assembly 32 along the frame spine 36 independently articulates as the vehicle traverses over uneven surfaces. Further, each sub-frame assembly 42A, 42B, independently articulates as each side of the vehicle traverses uneven surfaces. The suspension assembly 32 reduces or eliminates the torsional loading on the frame spine 36 by allowing the independent oscillation of the front and rear drive axles, as well as independent oscillation of the left and right drive axles. Employing internal direct drive electric (shown in block diagram form in FIG. 8) or high torque hydraulic motors (not shown) the dual wheel direct drive suspension assembly 32 allows front from rear and left from right rotation up to about 20 degrees both ways from the vehicle centerline. Under poor pavement conditions this allows travel through 17 inches of roadway obstructions. The struts 6, 7 may be employed to lower the vehicle ride height of truck 50 to a comparable degree, conditions allowing, to reduce vehicle drag while fifth wheel lift mechanism counteracts the drop in frame spine 36 height to maintain the fifth wheel 54 at a constant ride height H (shown in FIG. 3).

Figure 6:
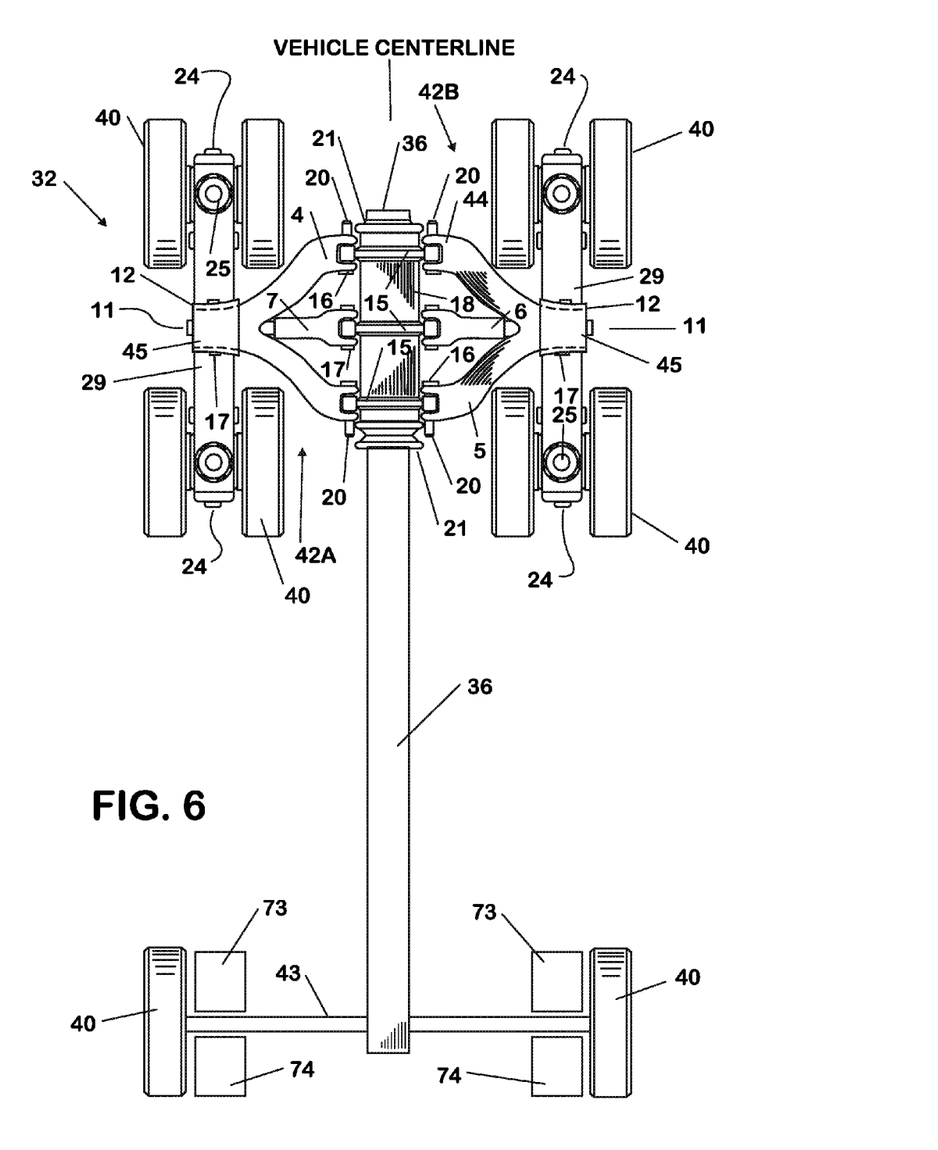
FIG. 6 is a top view of a vehicle chassis.

Referring to FIG. 6 frame spine 36 is shown extended forward to the location of a steering axle 43, at each end of which are mounted front wheels 40. Front wheels 40 support frame spine 36 along air springs 74 and may be equipped with suspension vertical travel sensors 73 which relate to automatic control modes of the system.

Struts 6, 7 may be variably and electronically controlled by automatic processes or by the operator while vehicle 52 is in motion. Higher pressure in the struts 6, 7 may be used to raise the overall height of the truck 50 to increase the articulation of the suspension assembly 32 or to increase the clearance of the suspension system. Lower pressure in the cylinder 6, 7 may be used to increase the vehicle's aerodynamics for highway use. To effect operation of the system the truck 50 may be equipped with a control system 27.

Figure 8:
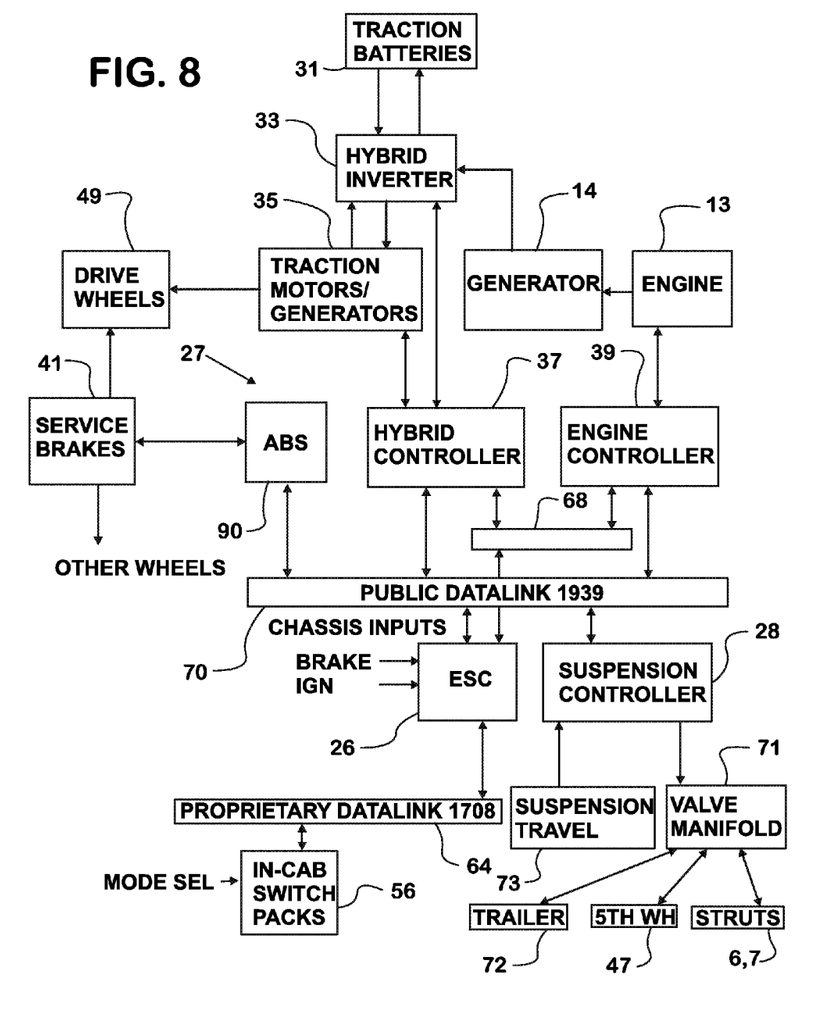
FIG. 8 is a block diagram of a control system for the suspension and fifth wheel assembly.

Referring to FIG. 8 a control system 27 and major truck 50 components relating to control over truck 50 operating height are illustrated. In brief, a hybrid type drive train is contemplated, illustrated here as series diesel/electric system incorporating an internal combustion engine 13 for driving a generator 14, a hybrid inverter connected to receive power from the generator 14 and applying it to either traction batteries 31 for charging or directly to the direct drive traction motors/generators 35 installed on the direct drive axle assemblies 38 for powering drive wheels 49. Alternatively a hydraulic system could be employed substituting hydraulic motors for the direct drive traction motors 35, a hydraulic accumulator for the hybrid inverter 33 and traction batteries 31 and a pump for the generator 14.

Control system 27 may be based on dual controller area networks based on datalink 68 and datalink 70. The datalinks 68, 70 may conform to the Society of Automotive Engineers J1939 standard. A hybrid controller 37, an engine controller 39 and an electronic system controller (ESC) 26 are connected to both datalinks 68 and 70. An anti-lock brake system (ABS) controller 90 and a suspension controller 28 are connected only to the public datalink 70. The ABS controller 90 can supply vehicle velocity information to the other controllers from measurements taken by service brake 41 sensors. The suspension controller 28 may be adapted both to control strut 6, 7 extension and to control fifth wheel lift mechanism 47 extension through a valve manifold 71. Valve manifold 71 represents both hydraulic and pneumatic systems. It may also be used to supply air to trailer air springs 72. In addition the suspension controller 28 monitors suspension travel sensors 73 which may be used to measure driving surface roughness. In automatic modes the suspension controller 28 can operate on vehicle speed and driving surface roughness related data to automatically set the vertical drive height of truck 50. For example, at sustained low speeds there the system may be programmed to return to a "normal" drive height rather than a reduced, aerodynamic height. The control system 27 may be assumed to include connections to a trailer and providing for determination as to whether a trailer is present.

Manual input of constraint modes into the control system 27 may be implemented using mode select switches which are part of an in-cab switch pack 56. The states of the switches are communicated to the ESC 26 over a datalink 64 and from ESC 26 to suspension controller 28 over datalink 70. The operator may choose between settings, for example on-highway, off-highway, off-road and auto settings. In addition the truck 50 may be lowered to allow easy ingress and egress/vehicle service or the system may be turned off and the truck returned to a default "standard" height. The settings may control the levels of articulation, the vehicle height clearances, the direct drive acceleration response, the vehicle velocity limits, the steering ratios and the electronically controlled shock damping, among other settings.

What is claimed is:

1. A truck for towing a trailer, the truck comprising:
a single vehicle frame spine located along a longitudinal center line of the truck;
left and right side direct drive assemblies having drive wheels;
left and right side double wishbone suspension assemblies extending between the vehicle frame spine and the direct drive assemblies for supporting the vehicle frame spine from the direct drive assemblies;
an extensible strut positioned between the vehicle frame spine and each of the direct drive assemblies allowing vehicle drive height from a driving surface to the vehicle frame spine to be varied;
a fifth wheel assembly supported from the vehicle frame spine and located above the direct drive assemblies; and
the fifth wheel assembly including a fifth wheel and a fifth wheel lift assembly which is operable to vary spacing of the fifth wheel from the vehicle frame spine if a trailer is attached thereto to allow the trailer to be kept at a fixed height.

2. A truck as claimed in claim 1, further comprising:
a control system operable to extend and retract the extensible struts responsive to selection of a vehicle drive height and further operable to operate the fifth wheel lift assembly to counteract changes in vehicle drive height and maintain a constant fifth wheel drive height relative to the driving surface.

3. A truck as claimed in claim 2, further comprising:
the control system providing means for operator input of constraint modes including on-highway, off-highway, off-road and automatic constraint modes.

4. A truck as claimed in claim 3, further comprising:
the control system providing for operator selection of a reduced height when the truck is stopped.

5. A truck as claimed in claim 3, further comprising:
a default extensible strut position when no constraint mode is active.

6. A truck as claimed in claim 2, further comprising:
a sensor system providing an indication of driving surface condition; and
the control system being responsive to the indication of driving surface condition for setting the extension of the extensible struts dynamically.

7. A truck as claimed in claim 3, further comprising:
a sensor system providing an indication of driving surface condition; and
the control system being responsive to the indication of driving surface condition for setting the extension of the extensible struts dynamically when the constraint mode is set to automatic.

8. A truck as claimed in claim 3, further comprising:
a trailer attached to the fifth wheel.

9. A vehicle comprising:
a single vehicle frame spine located along a longitudinal center line of the vehicle;
left and right side drive wheel assemblies;
left and right side double wishbone suspension assemblies extending between the vehicle frame spine and the left and right side drive wheel assemblies for supporting the vehicle frame spine from the left and right side drive wheel assemblies;
first and second extensible struts positioned between the vehicle frame spine and the left and right side drive wheel assemblies respectively allowing vehicle drive height from a driving surface to the vehicle frame spine to be varied;
a fifth wheel assembly supported from the vehicle frame spine and located above the left and right side drive wheel assemblies; and
the fifth wheel assembly including a fifth wheel and a fifth wheel lift assembly which is operable to vary spacing of the fifth wheel from the vehicle frame spine.

10. A vehicle as claimed in claim 9, further comprising:
a control system operable to extend and retract the extensible struts responsive to selection of a vehicle drive height and further operable to operate the fifth wheel lift assembly to counteract changes in vehicle drive height and maintain a constant fifth wheel drive height relative to the driving surface.

11. A vehicle as claimed in claim 10, further comprising:
the control system providing means for operator input of constraint modes including on-highway, off-highway, off-road and automatic constraint modes.

12. A vehicle as claimed in claim 11, further comprising:
the control system providing for operator selection of a reduced height when the vehicle is stopped.

13. A vehicle as claimed in claim 11, further comprising:
a default extensible strut position when no constraint mode is active.

14. A vehicle as claimed in claim 10, further comprising:
a sensor system providing an indication of driving surface condition; and
the control system being responsive to the indication of driving surface condition for setting the extension of the extensible struts dynamically.

15. A vehicle as claimed in claim 11, further comprising:
a sensor system providing an indication of driving surface condition; and
the control system being responsive to the indication of driving surface condition for setting the extension of the extensible struts dynamically when the constraint mode is set to automatic.

* * * * *